(12) United States Patent
Meekma et al.

(10) Patent No.: US 6,389,857 B1
(45) Date of Patent: May 21, 2002

(54) PUSH-BUTTON STEERING WHEEL LOCK

(75) Inventors: Glenn Meekma, Menomonee Falls, WI (US); Gaurav Rohatgi, Waltham, MA (US)

(73) Assignee: Master Lock Company, Milwaukee, WI (US)

( * ) Notice: Subject to any disclaimer, the term of this patent is extended or adjusted under 35 U.S.C. 154(b) by 0 days.

(21) Appl. No.: 09/540,746

(22) Filed: Mar. 31, 2000

(51) Int. Cl.[7] ............................................. B60R 25/02
(52) U.S. Cl. ............................ 70/209; 70/226; 70/238; 70/360
(58) Field of Search .......................... 70/169, 173, 360, 70/361, 384, 209, 225, 226, 237, 238, 367, 369, 370, 371, DIG. 20

(56) References Cited

U.S. PATENT DOCUMENTS

| | | | |
|---|---|---|---|
| 1,056,079 A | 3/1913 | Wood | |
| 1,369,308 A | 2/1921 | Taylor | |
| 3,602,017 A | 8/1971 | Bauer | 70/78 |
| 4,009,599 A | 3/1977 | Patriquin | 70/90 |
| 4,970,884 A | 11/1990 | Solow | 70/209 |
| 5,113,672 A | 5/1992 | Wang | 70/209 |
| 5,133,203 A | 7/1992 | Huang | 70/360 |
| 5,174,138 A | 12/1992 | Shen | 70/209 |
| 5,211,041 A | 5/1993 | Hsu | 70/209 |
| 5,255,544 A | 10/1993 | Wu | 70/209 |
| 5,329,794 A | 7/1994 | Lo | 70/209 |
| 5,440,908 A | 8/1995 | Lin | 70/209 |
| 5,447,049 A | 9/1995 | Shieh | 70/360 |
| 5,515,947 A | 5/1996 | Shieh | 188/69 |
| 5,713,228 A | 2/1998 | Huang | 70/209 |
| 5,720,191 A | 2/1998 | Tsung-Chuan et al. | 70/38 A |
| 5,722,275 A | 3/1998 | Price et al. | 70/379 R |
| 5,765,413 A | 6/1998 | Jung | 70/201 |
| 5,782,116 A | 7/1998 | Ryan et al. | 70/209 |
| 5,921,118 A | 7/1999 | Yuan | 70/201 |

OTHER PUBLICATIONS

"Barricade for 2000 ACURA," Web site http://www.performanceproducts.com/Catalog/MTCALF/Barricade.asp (3 pg.); Mar. 30, 2000.
"Metcalfe Plastics on the Web," Outerstate Web site http://www.metcalfe.com/main5.vs (1 pg.), Mar. 30, 2000.

Primary Examiner—Teri Pham Luu
(74) Attorney, Agent, or Firm—Calfee, Halter & Griswold LLP

(57) ABSTRACT

A push-button steering wheel lock for attachment to an automobile steering wheel is provided having a housing and a push-button assembly disposed in the housing. The assembly is positioned in either a locked position for securing the steering wheel lock to the steering wheel or an unlocked position. In the locked position, the push-button lock assembly engages a rod slideably disposed in the housing to prevent movement of the rod with respect to the housing. The push-button assembly also includes two levers, one each on either side of the assembly to engage two surfaces within the housing to retain the push-button assembly in the locked position and also to retain the push-button assembly in the housing.

11 Claims, 13 Drawing Sheets

PUSH-BUTTON STEERING WHEEL LOCK

BACKGROUND OF THE INVENTION

Push-button type locks are known that provide the user with the ability to move the lock from the unlocked to the locked position simply by pushing a button without the need for a key. The key, however, is needed to move the push-button lock from the locked to the unlocked position.

For example, U.S. Pat. No. 4,009,599 is directed to a plunger lock and discloses a longitudinally movable shell within a housing. A locking wafer projects from the periphery of the shell and is received by a locking slot defined by the housing. The wafer is biased to project from the periphery of the shell. When the shell is pushed to the locked position and the wafer becomes aligned with the locking slot, the wafer snaps into the slot thus establishing the locked position. The wafer can then be withdrawn from the slot in response to proper manipulation of the key.

U.S. Pat. No. 1,369,308 is directed to a locking means for automobiles. The locking means includes a plunger provided with a pin tumbler lock which extends down inside of the plunger and has a cam at its lower end for engaging locking pawls. The locking pawls are formed in the shape of bell crank levers pivoted in the plunger, their inner arms being engaged by the cam and their outer arms being adapted to move out laterally to a locking position. Springs engage the inner arms of the locking pawls tending to move them laterally out of the slots.

Locks of different combinations, including push-button type locks, have been applied to steering wheel locks. Steering wheel locks typically hook to the steering wheel of an automobile and prevent rotation of the steering wheel. These locks generally have two rod-like portions that are extensible with respect to each other and include a locking mechanism for securing the two portions in an extended position. Key-operable locks used to secure the two portions of a wheel lock in locked position are, for example, disclosed in U.S. Pat. Nos. 5,255,544 and 5,174,138.

SUMMARY OF THE INVENTION

In accordance with the present invention, a lock is provided containing a housing having a push-button assembly that is slideably disposed within a cavity in the housing. The push-button assembly has an unlocked position and is retained within the housing while in this unlocked position by a lever included in the assembly that engages a first surface within the cavity to prevent axially movement of the push-button within the cavity.

Inserting the push-button assembly into the cavity moves the lever into engagement with a second surface within the cavity. The assembly is then in the locked position and is held in this position by the engagement of the lever with the second surface. Although the push-button assembly can be moved from the unlocked to the locked position by pushing it into the cavity, a key is required to turn a lock cylinder within the assembly to move the push-button assembly from locked position to the unlocked position.

The push-button assembly of the present invention is applied to a steering wheel lock and is disposed in a first cavity within the housing of the steering wheel lock. A first engagement member attached to the housing is provided for engaging a steering wheel. The housing also includes a second cavity intersecting the first cavity. A rod is slidingly disposed in the second cavity. The rod has a second engagement member attached thereto for engaging the steering wheel and a corresponding non-cylindrical shape to prevent rotation of the rod in the second cavity. The rod is capable of sliding axially within the second cavity to move the second engagement member into and out of engagement with the steering wheel.

In the locked position, at least a portion of the push-button assembly containing a fastening surface extends into the second cavity to engage at least two of a plurality of circumferential notches disposed along the rod. Thus, when the rod is positioned such that the second engagement member is in contact with the steering wheel and the push-button lock assembly is moved to the locked position, the steering wheel lock is secured.

The arrangement of this lock provides easier attachment of the lock to the steering wheel and increased security. The push-button lock of the present invention is less susceptible to being defeated by "rapping", that is overriding the spring forces of the locking mechanism by imparting a force such as by a hammer through the housing to the locking mechanism. In addition, the steering wheel lock is more resistant to forces applied to an end of the rod in an attempt to shear the members holding the two portions of the lock.

DETAILED DESCRIPTION OF THE PREFERRED EMBODIMENT

Figure 1:
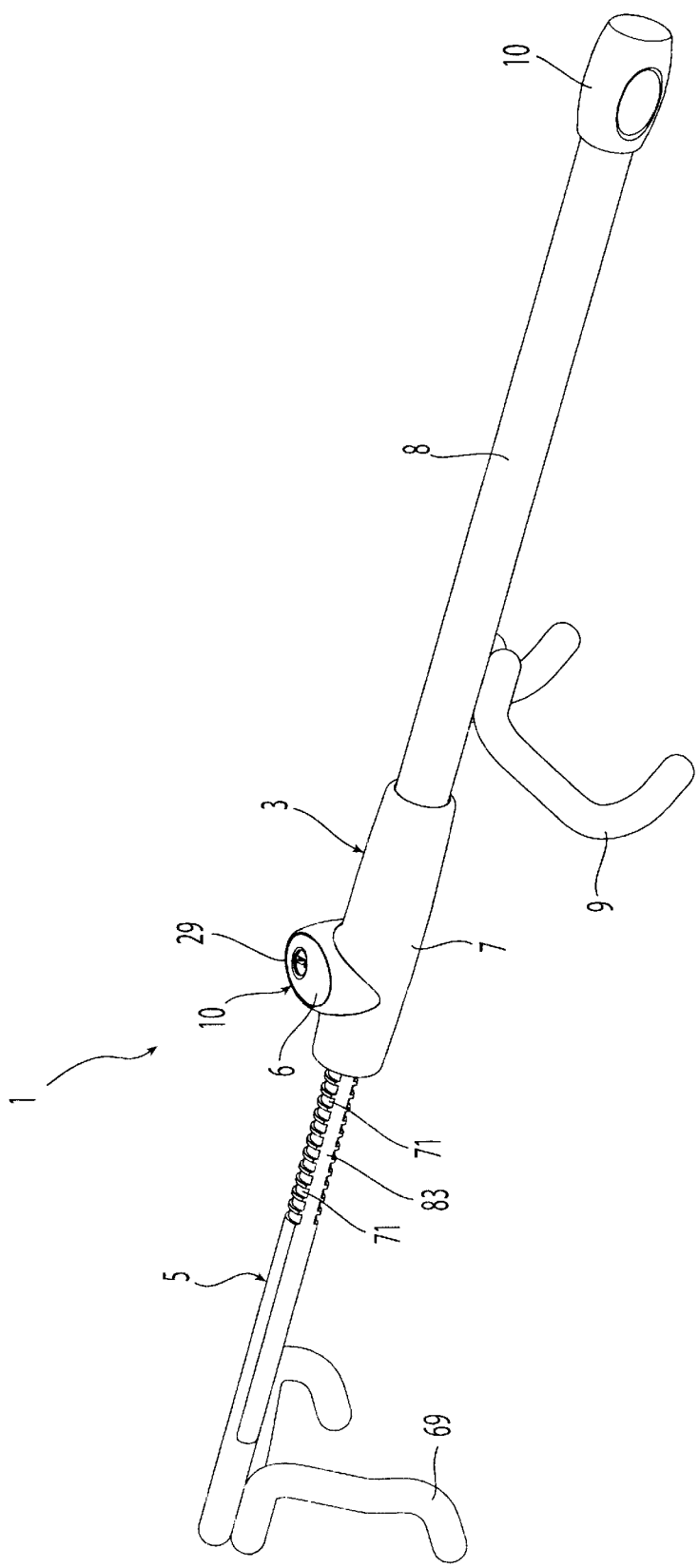
FIG. 1 is an top perspective view of the push-button steering wheel lock according the present invention.
Figure 2:
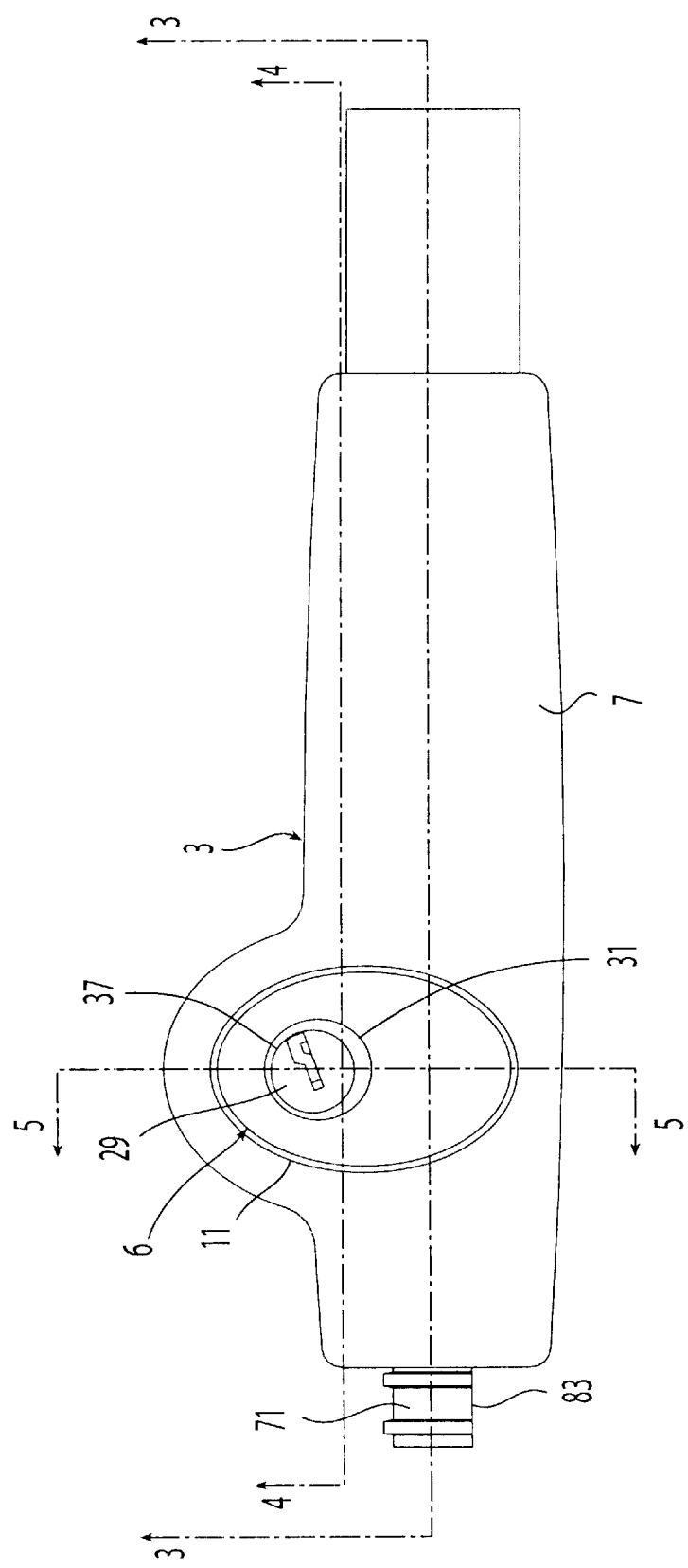
FIG. 2 is partial top view thereof showing the housing and push-button assembly in the unlock position.
Figure 3:
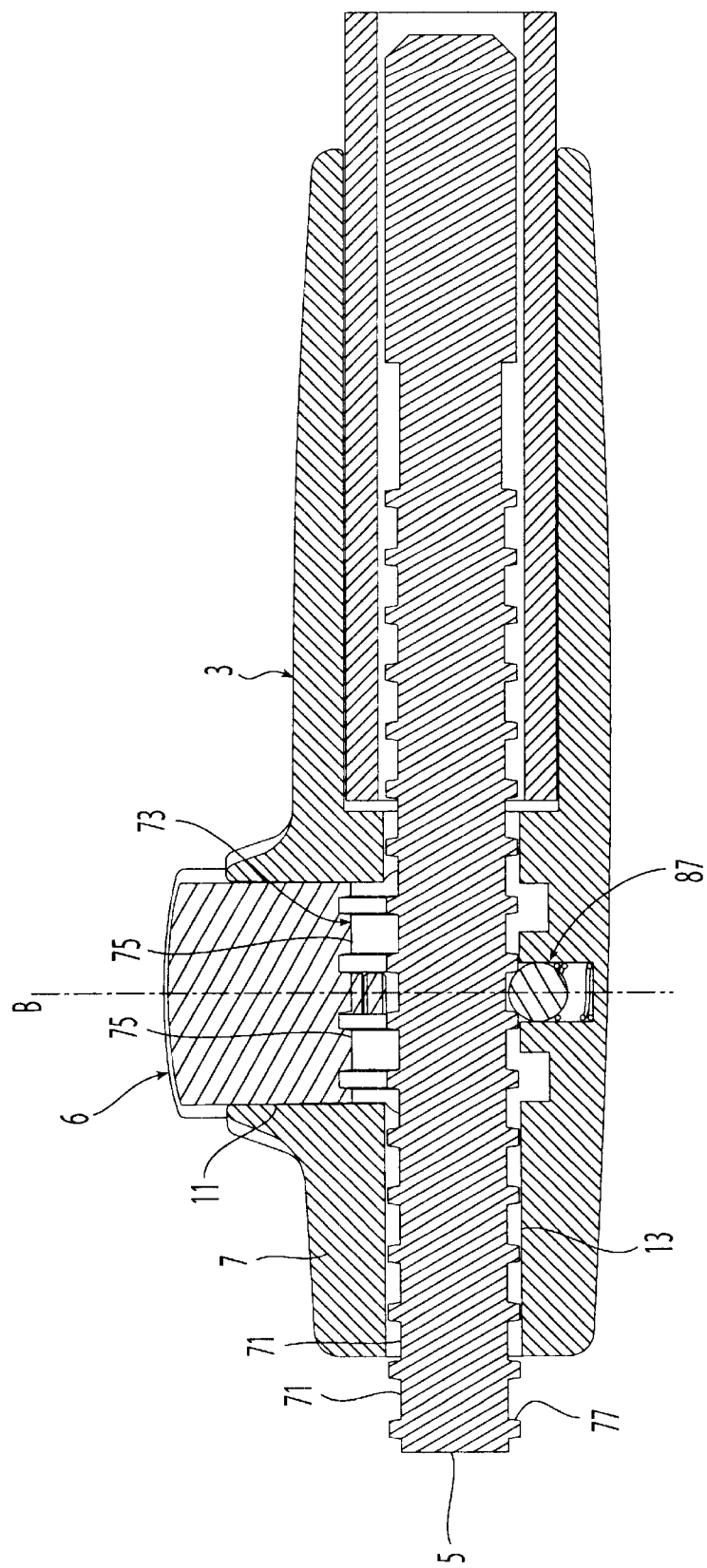
FIG. 3 is a view through line 3—3 of FIG. 2.

Referring initially to FIG. 1, the push-button steering wheel lock 1 according to the present invention includes a lock 3 and a rod 5. The lock 3 includes a push-button assembly 6 and a housing 7 to which a hollow extension sleeve member 8 is connected. A first engagement member 9 is attached to the sleeve member 8. The first engagement member 9 is used for engaging a steering wheel to secure the steering wheel lock 1 thereto. Preferably, the first engagement member 9 is a two pronged hook. A rubber grip 10 is provided on the sleeve member 8 to create a handle for gripping the push-button steering wheel lock 1.

As is best shown in FIGS. 2–9, the housing 7 includes a first cavity 11 and a second cavity 13. The first cavity 11 is cylindrical and has a non-circular cross-section such as an oblong or oval cross section. The second cavity 13 is also cylindrical and also has a non-circular cross-section. The first and second cavities intersect each other.

Figure 4:
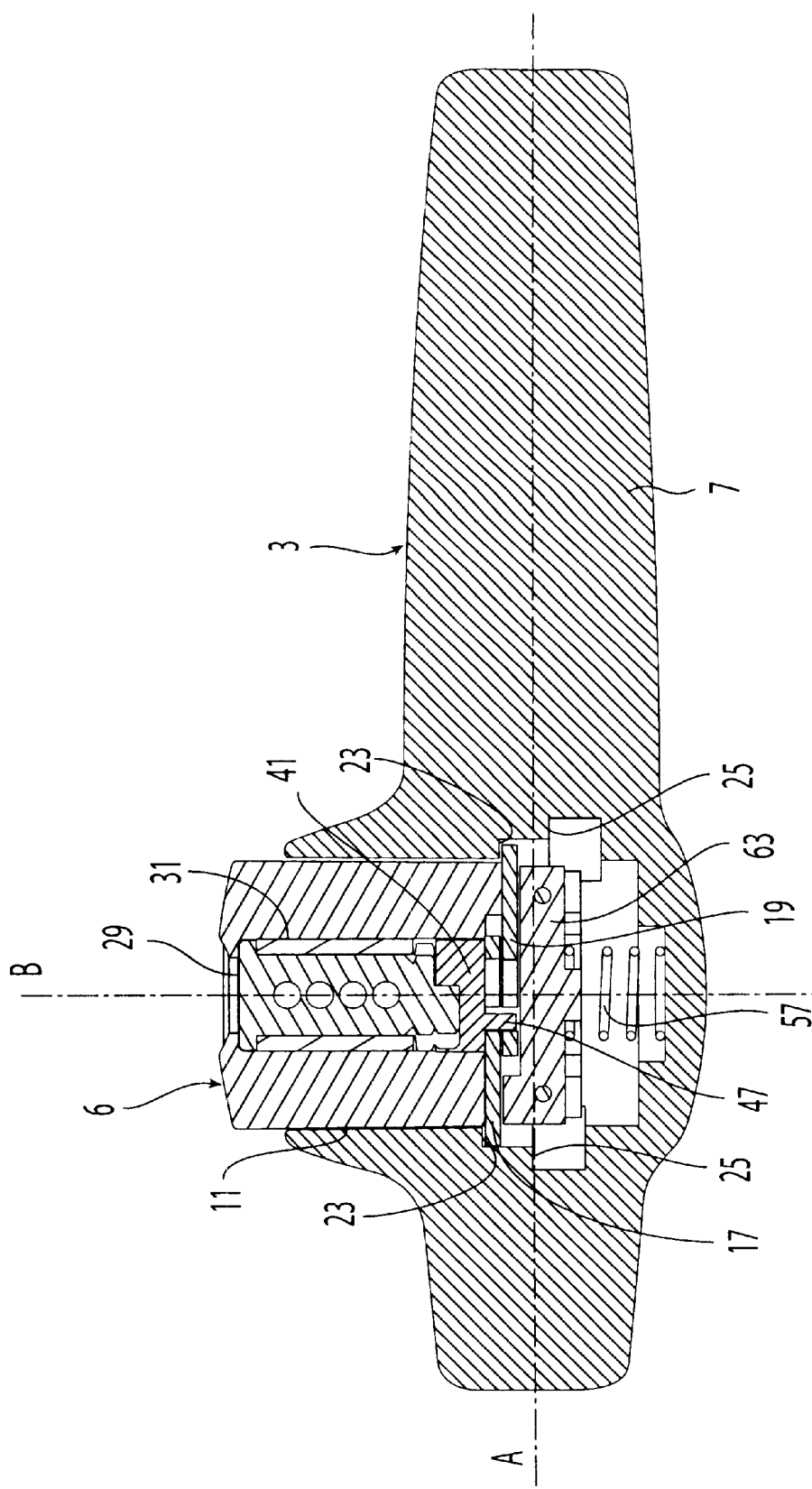
FIG. 4 is a view through line 4—4 of FIG. 2.
Figure 5:
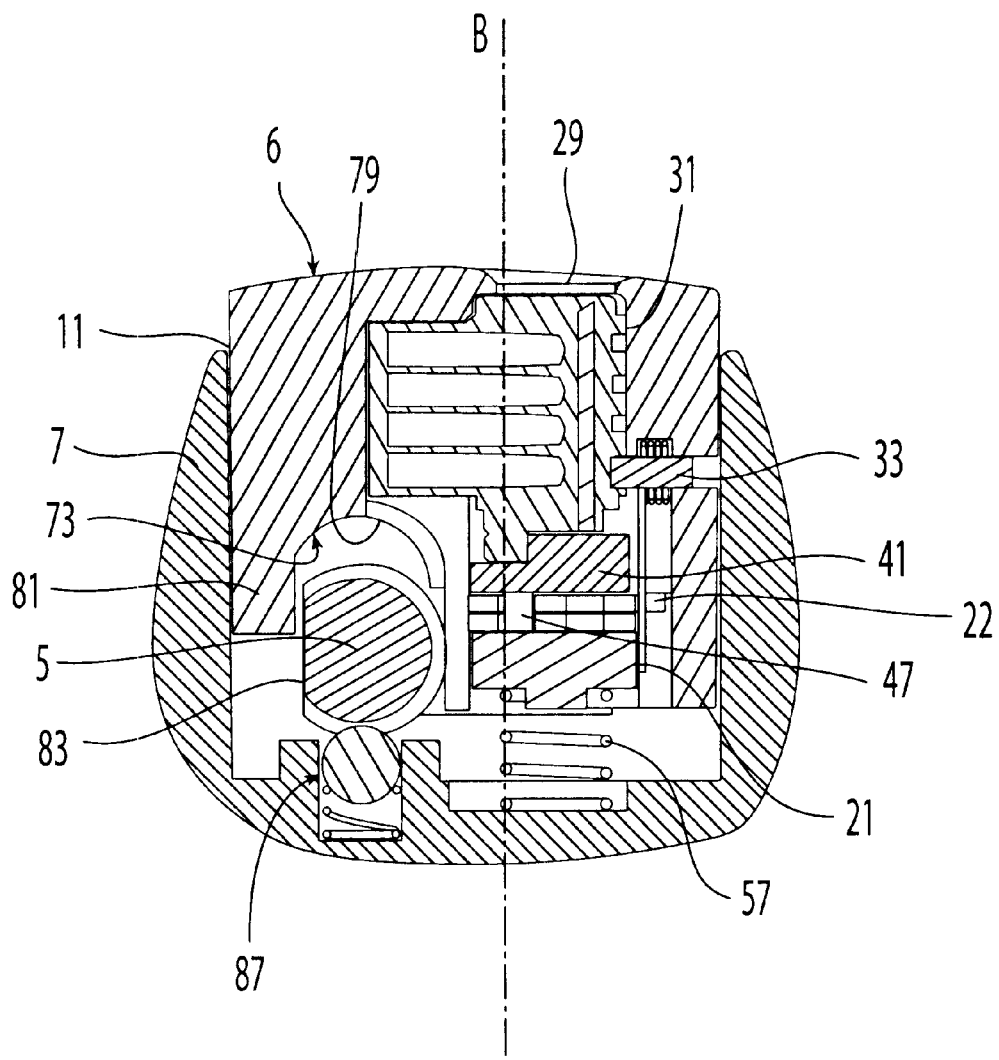
FIG. 5 is a view through line 5—5 of FIG. 2.
Figure 6:
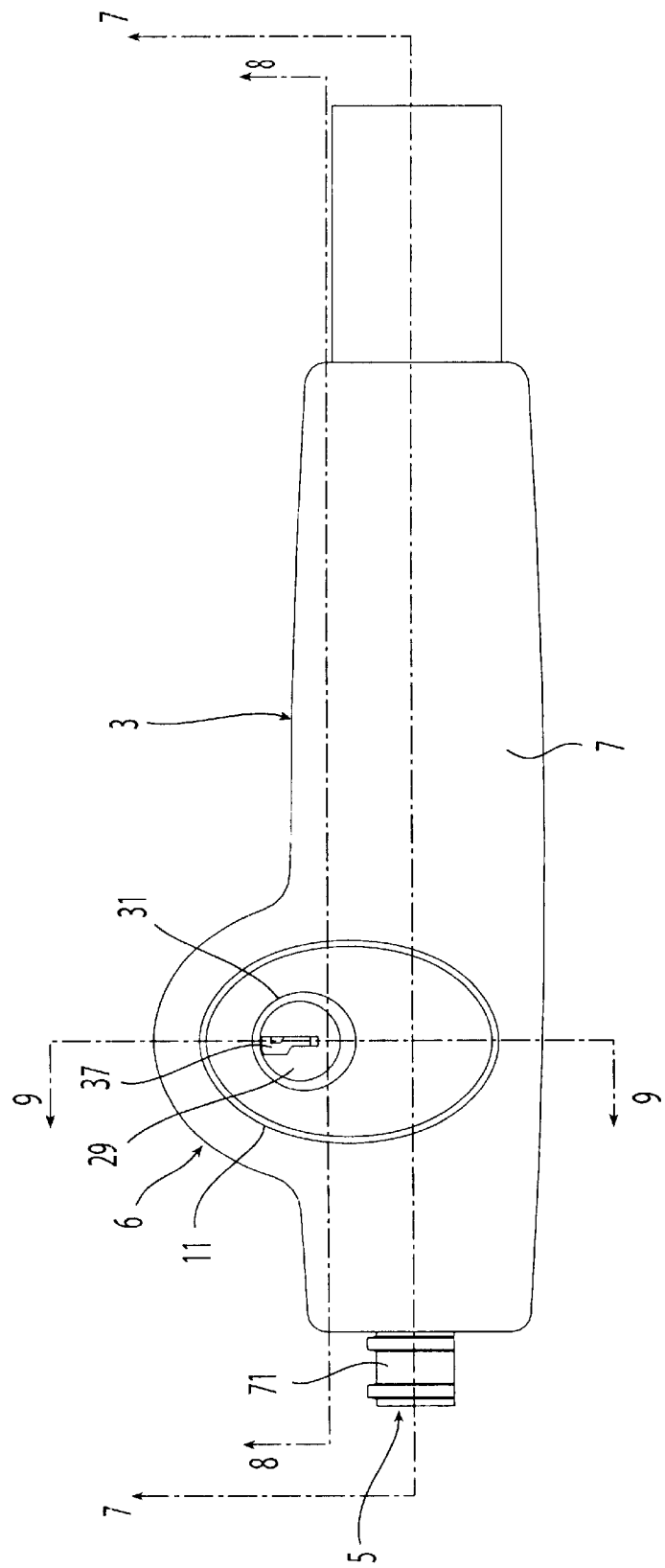
FIG. 6 is a partial top view of the push-button steering wheel lock showing the housing and the push-button assembly in the locked position.
Figure 7:
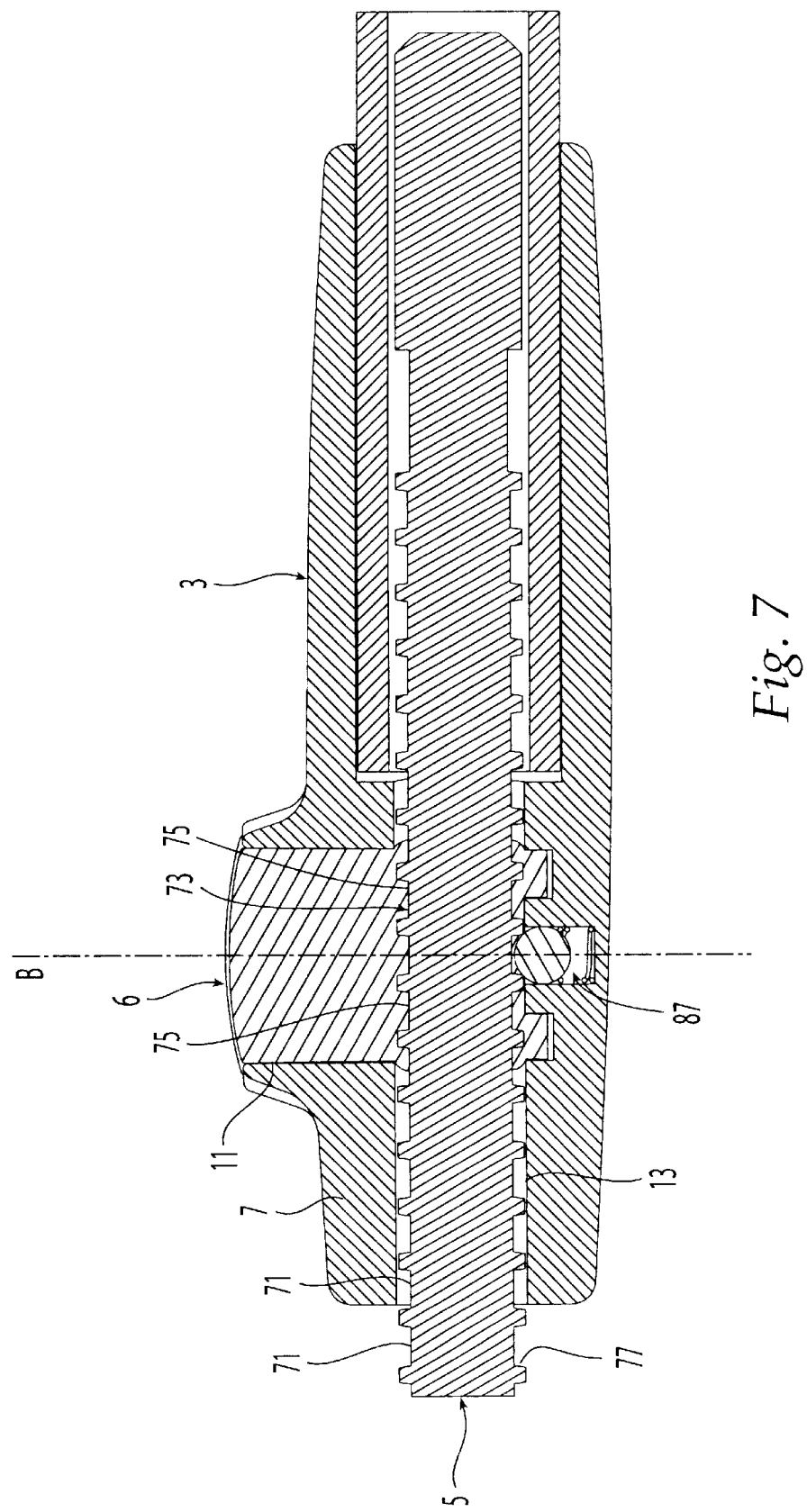
FIG. 7 is a view through line 7—7 of FIG. 6.
Figure 8:
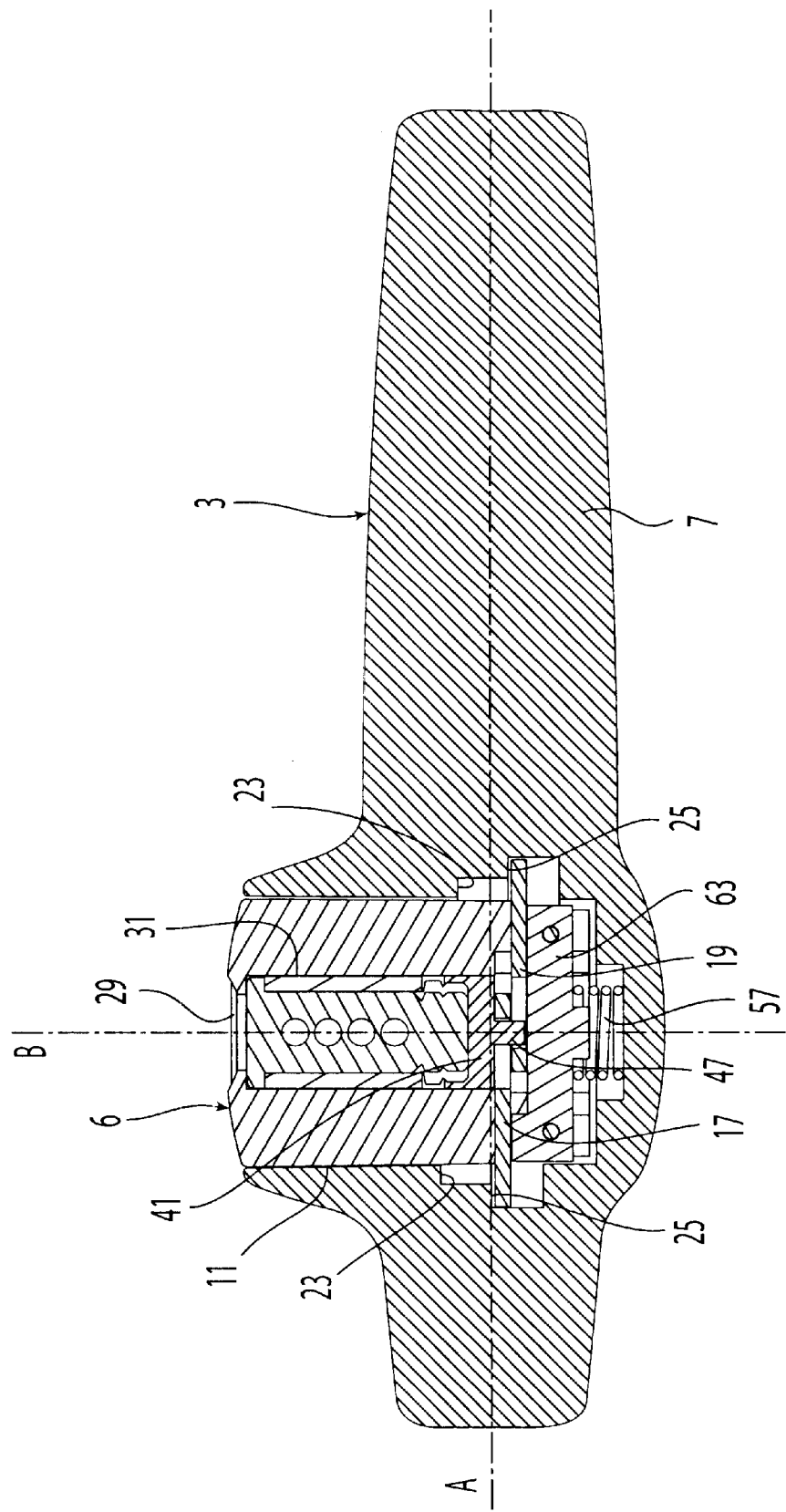
FIG. 8 is a view through line 8—8 of FIG. 6.

The push-button assembly 6 is slideably disposed in the first cavity 11 and is moveable between an extended unlocked position (FIGS. 2–5) and an inserted locked position (FIGS. 6–9). Slidingly mounted within the push-button assembly 6, and extending from opposite sides thereof, are two levers 17 and 19, although the advantages of the present invention can be realized with at least one lever. These levers are preferably identical and move between an inward position where the assembly 6 is in the unlocked position, as shown in FIG. 4, and an outward position where the assembly 6 is in the locked position, as shown in FIG. 8. The push-button assembly 6 includes a lever biasing member 21, such as a spring, in contact with ears 22 extending from both levers for biasing them toward their respective outward positions.

The first cavity 11 further includes first and second surfaces 23 and 25, for engagement with the two levers 17, 19. As is best shown in FIGS. 4 and 8, the first and second surfaces extend along a first direction A and face in a second direction B. The second direction B is generally perpendicular to the first direction A. The push-button assembly 6, in moving between the locked and unlocked position moves along the second direction B, and the levers in sliding between the inward and outward positions move along the first direction A. When in the inward position, the two levers 17, 19 are aligned, along the second direction B, for engaging the first surface 23 in the housing 7, thus permitting movement of the push-button assembly 6 along the second direction B to the locked position but holding the push-button assembly against an opposite movement along the second direction B, outwardly of the housing 7, from the unlocked position. In the outward position, the levers 17, 19 are aligned to engage the second surface 25 in the housing 7 to hold the push-button assembly 6 in the locked position and against movement along the second direction B to the unlocked position.

The levers 17, 19 both hold the push-button assembly 6 in the locked position and retain the assembly 6 within the housing 7 in the unlocked position. Therefore, the lock 3 is much simpler, less expensive, easier to assemble, and has fewer operative parts. By having two levers extending from opposite sides of the lock assembly, the lock cannot be defeated by rapping one side of the housing 7 with an object such as a hammer in an attempt to move one lever to the inward position against the force of the lever biasing spring 21, since this same force would tend to drive the other lever toward the outward locked position.

The push-button assembly 6 also includes a key-operable lock cylinder 29 rotatably disposed in an opening 31. A lock cylinder retention pin 33 holds the lock cylinder 29 in the opening 31. The lock cylinder 29 is preferably a standard key operable cylinder having a plurality of tumblers. The lock cylinder 29 includes a first end 35 having a slot 37 for accepting a key (not shown) and a second end 39 opposite the first end 35. The second end 39 has a non-circular shape such as a portion of a circle.

The key, corresponding to the tumbler pattern in the lock cylinder 29, is inserted into the slot 37 in the first end 35 and rotated from this insertion position through an angle of no more than about 45° in either a clockwise or a counter-clockwise direction. This rotates the second end 39 about an axis extending along the second direction B. When the key is released after rotation, the key will return to the initial position under the force of a rotationally biasing spring disposed in the lock cylinder 29.

The push-button assembly 6 further includes a cylindrically shaped extension 41 of the lock cylinder 29. The cylinder extension 41 rotates about the lock cylinder axis of rotation. The cylinder extension 41 includes a first side 43 having a non-circular shape that is the compliment of and in contact with the non-circular shape of the second end 39 of the lock cylinder 29. The cylinder extension 41 also includes a second side 45 opposite the first side 43 and having two tangs 47 as shown in the figures, extending therefrom, although the extension could be eliminated, and the tangs could extend directly from the second end 39 of the lock cylinder 29. The tangs 47 are disposed eccentrically on the second side 45 of the cylinder extension 41 with respect to the lock cylinder axis of rotation. The tangs 47 engage in slots 49 disposed in each of the levers.

Figure 13:
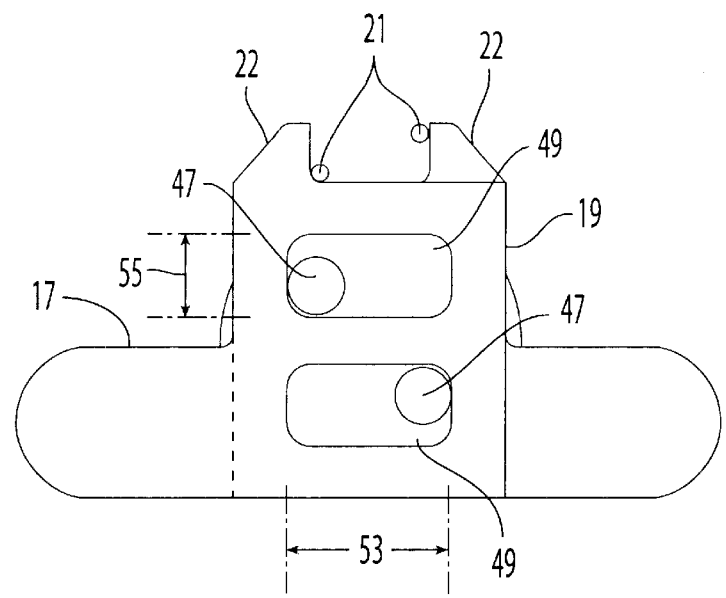
FIG. 13 is a rear view of the levers of the push-button assembly in the inward position.
Figure 12:
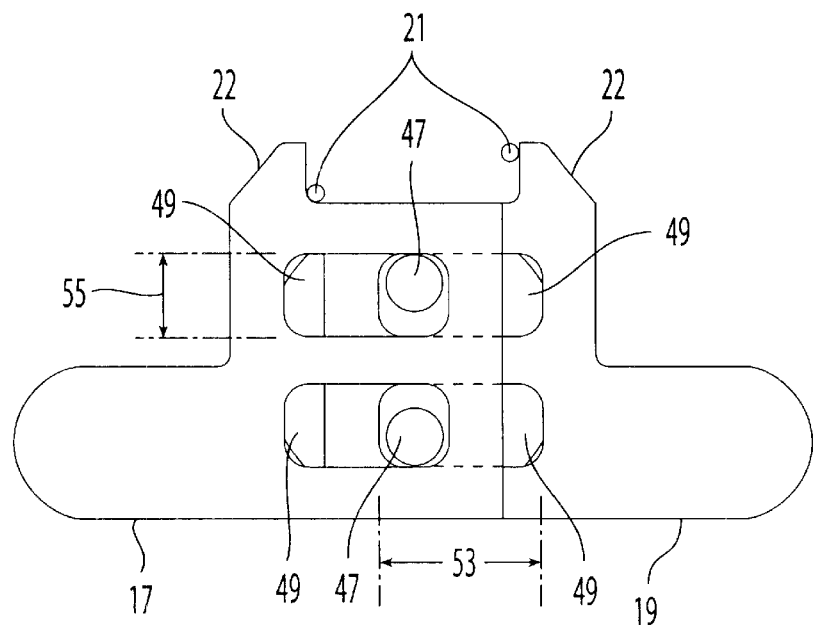
FIG. 12 is a rear view of the levers of the push-button assembly in the outward position.

As is best shown in FIGS. 12 and 13, each lever contains two slots 49, one above the other, and the slots 49 are oblong in shape and have a long axes 53 in alignment with the first direction A. The slots 49 also have short axes 55 perpendicular to the long axes 53. The tangs 47 are sized to permit their movement within the slots 49 along both the long axes 53 and the short axes 55. In FIG. 12, the levers are in the outward position, and the tangs 47 are in contact with one end of the long axes 53. As the cylinder extension 41 is rotated counter-clockwise, the tang 47 disposed in the upper slots 49 will push against the end of the slot 49 in the lever 19 that is closest to the cylinder extension 41, moving this lever 19 toward the inward position. The tang 47 in the upper slots 49 will at the same time move along the long axis 53 of the other lever 17 and along the short axes 55 of both levers 17, 19. Concurrently, the tang 47 disposed in the lower slots 49 will push against the end of the slot 49 in the lever 17 that is farthest from the cylinder extension 41, moving this lever 17 toward the inward position. The tang 47 in the lower slots 49 will at the same time move along the long axis 53 of the other lever 19 and along the short axes 55 of both levers. Rotation of the cylinder extension 41 can continue until the tangs 47 pass completely along the long axes 53 and contact the opposite ends of the slots 49 as is best shown in FIG. 13. The levers 17, 19 are now in their inward positions.

The levers move independently of the tangs 47 from the inward to the outward positions. As such, when the push-button assembly 6 is pushed from the extended to the inserted position, the levers are slideably advanced by the lever biasing spring 21 to their outward positions. As the levers move from their inward to their outward positions, the tangs 47 pass along the long axes 53 until making contact with one of the two ends in the slots 49. Each lever moves a distance from the inward to the outward position defined by the initial location of the tangs 47 within each slot with respect to the ends of the slots. Therefore, depending on the location of the tangs 47 in the slots 49 prior to pushing the push-button assembly 6 to the inserted position, the tangs 47 can act as a travel limiting device to define the extent of travel of the levers toward the outward position.

As is shown in FIGS. 4, 5, 8, and 9, the push-button steering wheel lock 1 also includes an assembly biasing member 57, such as a spring, disposed between the housing 7 and the push-button assembly 6 to bias the push-button assembly 6 towards the unlocked position. Therefore, when unlocking the lock, the key merely has to be rotated and the push-button assembly 6 itself does not have to be pulled because the push-button assembly 6 moves toward the unlocked position under the force of the assembly biasing spring 57 until the levers contact the first surfaces 23. In addition, since the biasing spring 57 biases the push-button assembly 6 toward the unlocked position, the biasing spring 57 holds the levers against the first and second surfaces, resulting in a more secure lock with less play.

Figure 10:
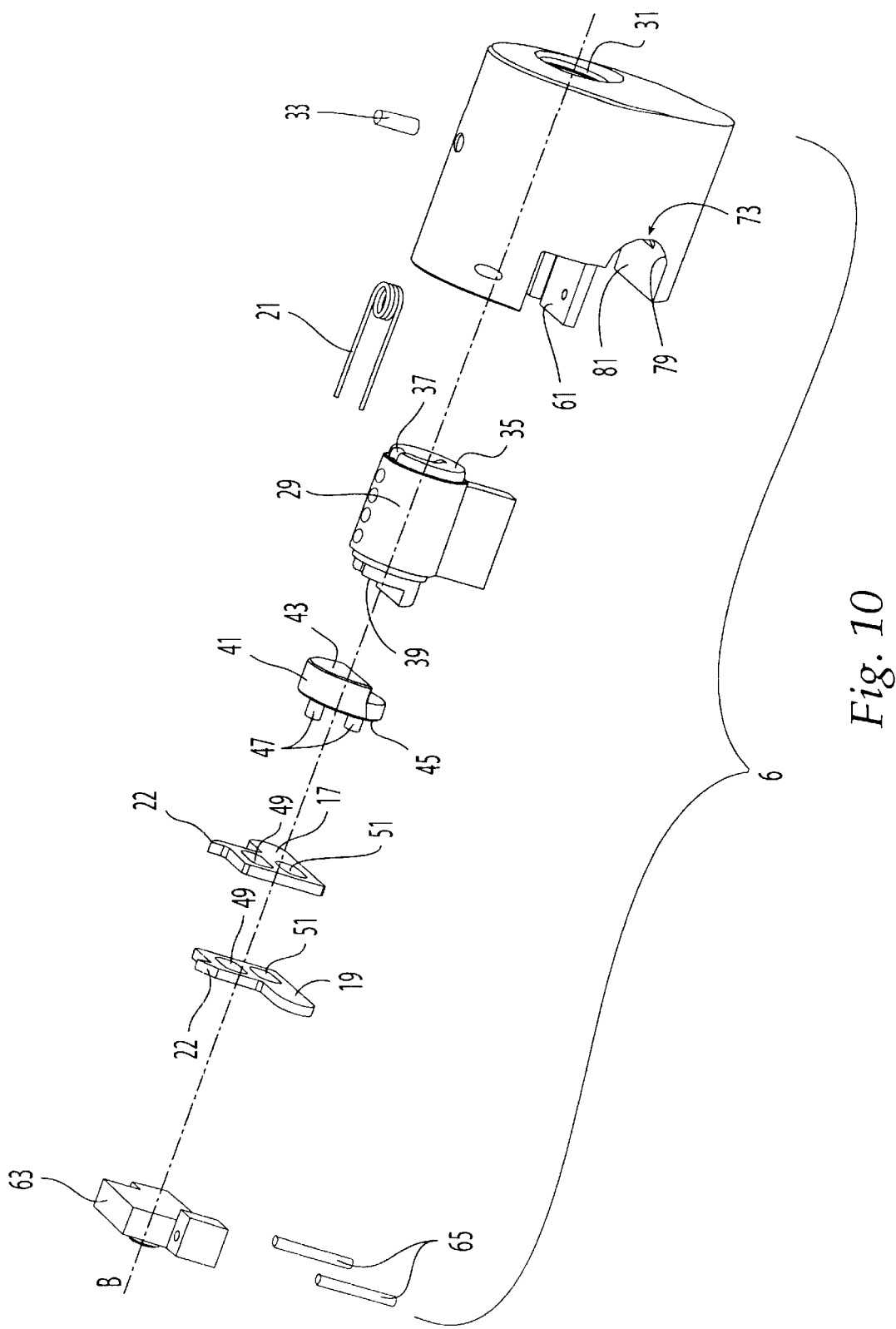
FIG. 10 is an exploded top perspective view of the push-button assembly.
Figure 11:
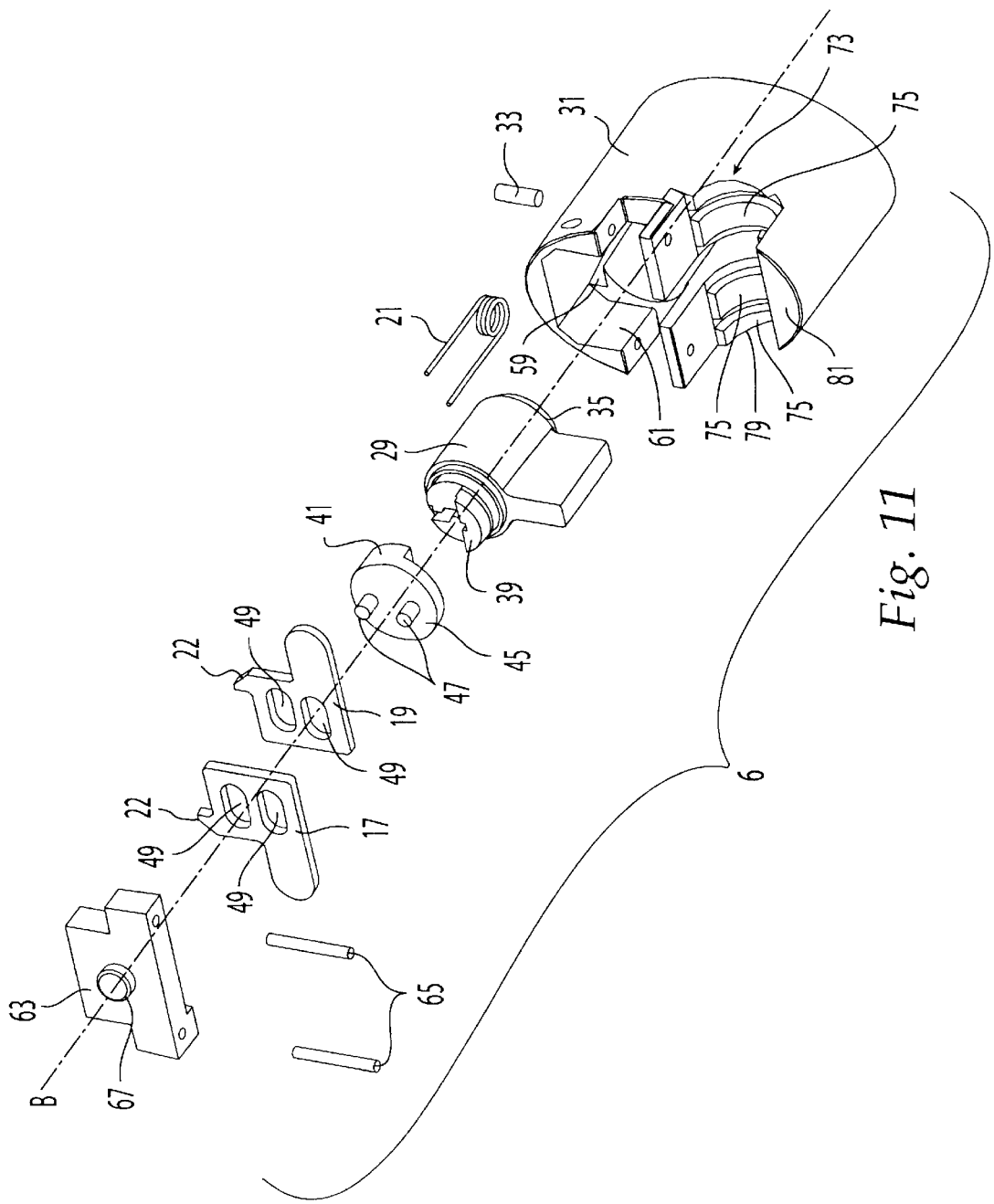
FIG. 11 is an exploded bottom perspective view thereof.

As is shown in FIGS. 10 and 11, the push-button assembly 6, in addition to the opening 31 for the lock cylinder 29, includes a groove 159 running along the top of the opening 31 to accommodate the lever biasing spring 21 and a cut-out section 61 shaped to accept the cylinder extension 41 and the levers. A backing plate 63 is provided and is shaped to cover the open end of the cut-out section 61 and to secure the extension 41 and levers within the cut-out section 61. The backing plate 63 is held in place by two backing plate set pins 65. The backing plate set pins 65 are located on either side of the opening 31 to more securely hold the backing plate 63 in the cut-out section 61 and to prevent movement of the backing plate 63 that would allow the push-button assembly 6 while in the locked position to flex toward the extended, unlocked position. The assembly biasing spring 57 is disposed between the housing 7 and the backing plate 63, and the backing plate includes a nub 67 extending into the center of the spring to align the spring with the backing plate 63.

As is shown in FIG. 1, the rod 5 of the lock 1 is slidingly disposed in the second cavity 13 and includes a second engagement member 69 attached thereto for engaging the steering wheel. The rod 5 slides axially within the second cavity 13 to move the second engagement member 69 into and out of engagement with the steering wheel. The rod 5 freely moves into and out of the second cavity 13 in the housing 7 and sleeve member 8 when the push-button assembly 6 is in the unlocked position. When the push-button assembly 6 is moved to the locked position, at least a portion of the push-button assembly 6 extends into the second cavity 13 and contacts the rod 5 to prevent axial movement of the rod 5 in the second cavity 13.

As is shown in FIGS. 3, 5, 7, and 9, the rod 5 includes a plurality of circumferential notches 71 disposed along its length. The push-button assembly 6 includes a fastening surface 73 to engage the notches 71 in the rod 5 when the push-button assembly 6 is in the locked position. The fastening surface 73 includes a plurality of teeth 75. Having a plurality of teeth 75 for the fastening surface 73 produces a locking mechanism that is stronger than locks having protrusions that only engage one notch. In addition, the lock of the present invention is not as susceptible to lock failure under attempts to violate the lock by rapping on the end of the rod 5 to shear the teeth off, because having a plurality of teeth spreads the rapping force over a greater surface area, protecting the integrity of the lock.

Figure 9:
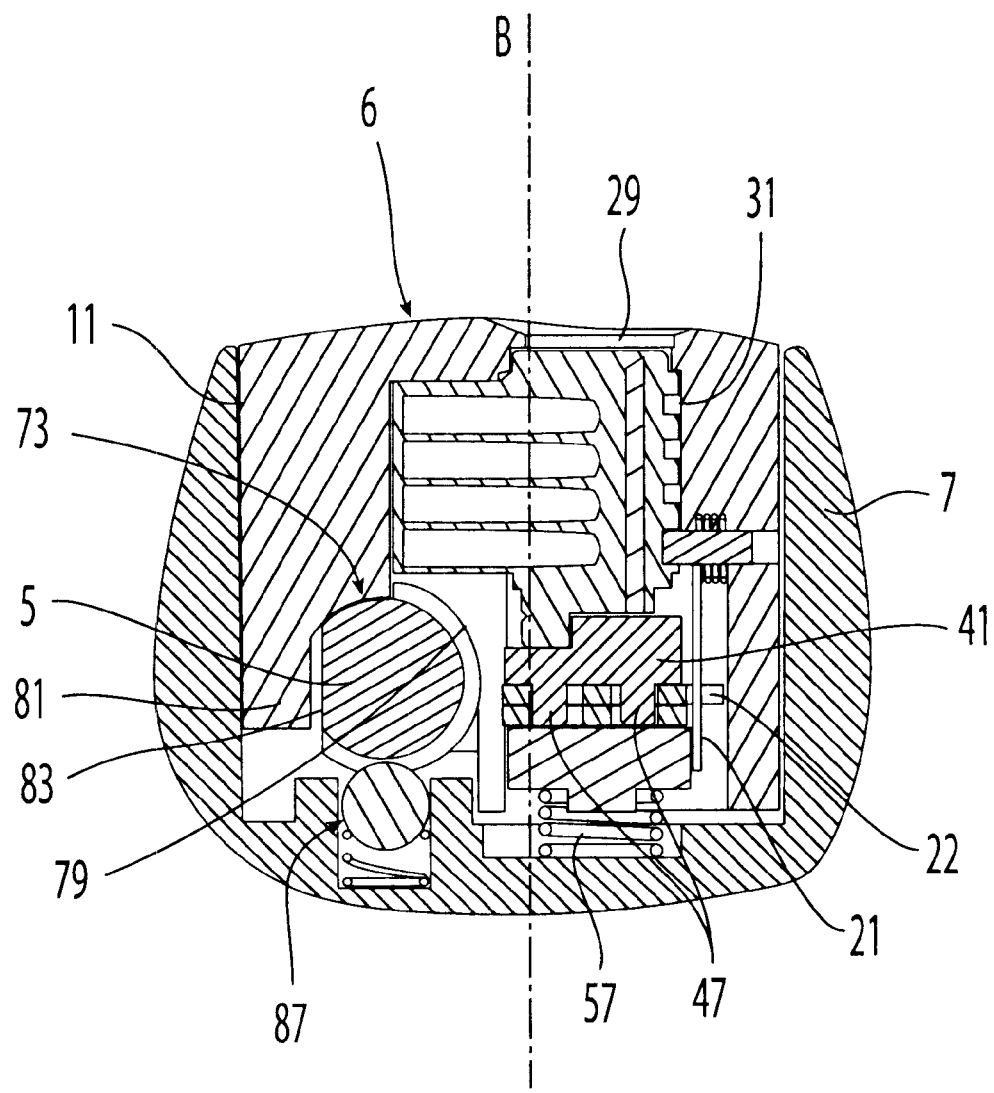
FIG. 9 is a view through line 9—9 of FIG. 6.

Additional protection against attempts to violate the lock is realized by increasing the number of teeth 75 in contact with the circumferential notches 71, by matching more closely the shape of the notches 71 and the teeth 75, by changing the angle of the walls 77 of the teeth and notches on both the rod 5 and fastening surface 73, and by increasing the contact area of the teeth 75 around the circumference of the rod 5. For example, the plurality of teeth 75 can engage either at least two notches 71 or at least three contiguous notches 71. As is shown in FIGS. 9–11, the plurality of teeth 75 are disposed in a circular groove 79 aligned with and corresponding to the circumference of the rod 5 such that in the locked position, the plurality of teeth 75 contact the notches 71 over about 180° around the circumference of the rod 5. Therefore, the teeth 75 rap around the top of the rod 5 to place the end point of the teeth 75 over the centerline of the rod 5.

Figure 14:
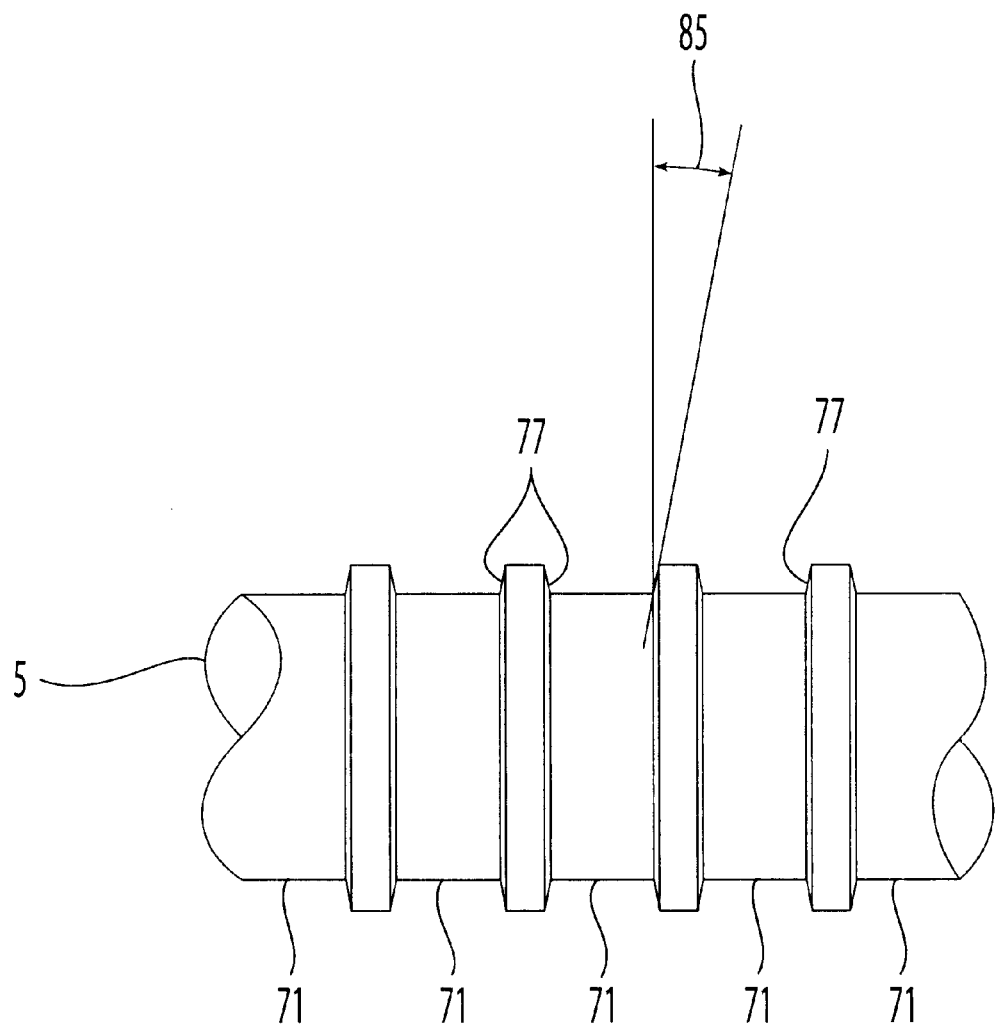
FIG. 14 is partial view of the steering wheel lock rod according to the present invention.

A flat protrusion 81 is provided adjacent the fastening surface 73 to engage a flat surface 83 running along the length of the rod 5, providing increased stability to the push-button steering wheel lock 1 and better engagement of the teeth 75 with the notches 71 in the rod 5. As is shown in FIG. 14, the angle 85 of the walls 77 that define the notches 71, and conversely, the walls 77 that define the teeth 75, is 10°, although an angle 85 of up to about 30° can be provided. The 10° angle 85 reduces the camming effect of the walls 77 on the push-button assembly 6 toward the unlocked position under a rapping force applied to the end of the rod 5.

As is shown in FIGS. 3, 5, 7, and 9, since the fastening surface 73 is arranged to be form fitting with the plurality of notches 71 in the rod 5 and the push-button assembly 6 is simply pushed into a locked position, a spring loaded ball assembly 87 is provided between the housing 7 and the rod 5. The assembly 87 seats in one of the notches 71 and provides incremental, ratcheting adjustment action of the rod 5 and a tactile indication of when the notches 71 and teeth 81 are in proper alignment. The assembly 87 does not, however, prevent axially movement of the rod 5 within the housing 7 as does the push-button assembly 6.

With respect to the operation of the push-button steering wheel lock 1, the push-button assembly 6 is initially in the extended, unlocked position. The steering wheel lock 1 is positioned within the inner diameter of a steering wheel, and the rod 5 and housing 7 are extended with respect to each other until the first and second engagement members 8, 69 contact the inner diameter of the steering wheel. After the steering wheel lock 1 is properly fitted to the steering wheel, the push-button assembly 6 is moved to its inserted locked position allowing the levers 17, 19 to move to the outward position and into contact with the second surfaces 25 in the first cavity 11. The teeth 75 on the fastening surface 73 are now engaged in the notches 71 on the rod 5, preventing the rod 5 from moving in the second cavity 13 of the housing 7. To unlock the steering wheel lock 1, a key is inserted into the lock cylinder 29 and rotated. This in turn rotates the cylinder extension 41, pulling the levers to the inward positions and allowing the assembly biasing spring 57 to expand to move the push-button assembly 6 to the unlocked position and to place the levers into contact with the first surfaces 23 within the first cavity 11. The rod 5 is slid axially into the housing 7, disengaging the first and second engagement members 8, 69 from the inner diameter of the steering wheel, and the push-button steering wheel lock 1 is removed from the steering wheel.

What is claimed is:
1. A push-button steering wheel lock comprising:
 a. a housing having:
  i) a first cavity; and
  ii) a second cavity, the second cavity intersecting the first cavity;
 b. a first engagement member attached to the housing for engaging a steering wheel; and
 c. a rod slidingly disposed in the second cavity, the rod comprising:
  i) a second engagement member attached thereto for engaging the steering wheel; and
  ii) a plurality of axially displaced circumferential notches, wherein the rod is capable of sliding axially within the second cavity to move the second engagement member into and out of engagement with the steering wheel; and
 d. a push-button assembly disposed in the first cavity and movable between an extended unlocked position and an inserted locked position, the push-button assembly comprising:

i) a fastening surface engaging in at least two notches in the rod when the push-button lock assembly is in the locked position, wherein the fastening surface comprises a plurality of teeth, wherein the plurality of teeth are disposed in a circular groove aligned with and corresponding to a circumference of the rod such that in the locked position, the plurality of teeth contact the notches approximately 180° around the circumference of the rod.

2. The push-button steering wheel lock of claim 1, wherein:
   a. the rod further comprises a flat surface running axially along its length;
   b. the push-button assembly further comprises a flat protrusion disposed adjacent the fastening surface; and
   c. the flat protrusion engages the flat surface when the fastening surface engages the notches to provide stability to the push-button steering wheel lock.

3. The push-button steering wheel lock of claim 1, wherein the fastening surface engages at least three contiguous notches in the rod.

4. A push-button steering wheel lock comprising:
   a housing having:
      i) a first cavity; and
      ii) a second cavity, the second cavity intersecting the first cavity;
   b. a first engagement member attached to the housing for engaging a steering wheel; and
   c. a rod slidingly disposed in the second cavity, the rod comprising:
      i) a second engagement member attached thereto for engaging the steering wheel; and
      ii) a plurality of axially displaced circumferential notches, wherein the rod is capable of sliding axially within the second cavity to move the second engagement member into and out of engagement with the steering wheel; and
   d. a push-button assembly disposed in the first cavity and movable between an extended unlocked position and an inserted locked position, the push-button assembly comprising:
      i) a fastening surface engaging in at least two notches in the rod when the push-button lock assembly is in the locked position; and
      ii) at least one lever disposed in the assembly and engaging at least one surface in the first cavity when the push-button assembly is in the locked position to retain the push-button assembly in the locked position.

5. The push-button steering wheel lock of claim 4 wherein the push-button assembly further comprises:
   a. two levers slideably disposed in the push-button assembly between an inward position when each lever engages a first surface in the first cavity when the push-button assembly is in the unlocked position to retain the push-button assembly in the first cavity and an outward position when each lever engages a second surface in the first cavity when the push-button assembly is in the locked position to retain the push-button assembly in the locked position; wherein the two levers extend from opposite sides of the push-button assembly.

6. A push-button lock comprising:
   a. a housing having a cavity and at least one surface in said cavity extending along a first direction and facing in a second direction generally perpendicular to said first direction;
   b. a push-button assembly disposed in the cavity and movable along said second direction between an extended unlocked position and an inserted locked position, the push-button assembly including two levers slidably disposed in the assembly for movement along said first direction between an inward position permitting movement of the push-button assembly along said second direction and an outward position engaging said surface in said housing and holding said push-button assembly in said locked position and against movement along said second direction to said unlocked position, each of said levers having a slot therein;
   c. a key-operable lock cylinder rotatably disposed in an opening in the push-button assembly for rotation about an axis extending along said second direction, the lock cylinder having a first end for accepting a key and a second end opposite the first end; and
   d. two tangs extending from the second end of the lock cylinder at locations offset relative to said axis of rotation of said lock cylinder, with one of the tangs engaging in the slot of one of the levers and the other tang engaging in the slot of the other lever, wherein when a key is inserted into the first end of the lock cylinder and rotated, the second end of the lock cylinder rotates to move said tangs in said slots to move said levers from the outward position to the inward position.

7. The push button lock of claim 6, wherein:
   a. the housing has first and second surfaces in said cavity each extending along the first direction and facing in the second direction; and
   b. the two levers are slidably disposed between an inward position engaging said first surface in said housing permitting movement of the push-button assembly along said second direction to said locked position and holding said push-button assembly against movement along said second direction from said unlocked position away from said locked position and an outward position engaging said second surface in said housing and holding said push-button assembly in said locked position and against movement along said second direction to said unlocked position.

8. The push-button lock of claim 7, wherein:
   a. the push-button assembly is disposed in a first cavity;
   b. the housing further comprises a second cavity, the second cavity intersecting the first cavity;
   c. the lock further comprises:
      i.) a first engagement member attached to the housing for engaging a steering wheel; and
      ii.) a rod slidingly disposed in the second cavity, the rod comprising:
         A.) a second engagement member attached thereto for engaging the steering wheel; and
         B.) a plurality of axially displaced circumferential notches, wherein the rod is capable of sliding axially within the second cavity to move the second engagement member into and out of engagement with the steering wheel; and
   d. the push-button assembly further comprises:
      i.) a fastening surface engaging at least two notches in the rod when the push-button lock assembly is in the locked position.

9. The push-button lock of claim 8 wherein the fastening surface comprises a plurality of teeth.

10. The push-button lock of claim 9 wherein the plurality of teeth are disposed in a circular groove aligned with and corresponding to a circumference of the rod such that in the locked position, the plurality of teeth contact the notches approximately 180° around the circumference of the rod.

11. The push-button lock of claim 10 wherein:

a the rod further comprises a flat surface running axially along its length;

b. the push-button assembly further comprises a flat protrusion disposed adjacent the fastening surface; and c. the flat protrusion engages the flat surface when the fastening surface engages the notches to provide stability to the push-button lock.

\* \* \* \* \*